US011406904B2

(12) United States Patent
Lee (10) Patent No.: US 11,406,904 B2
(45) Date of Patent: Aug. 9, 2022

(54) GAMING METHOD AND SYSTEM USING SKILL SUCCESSION IN SPORTS GAME

(71) Applicant: GAMEVIL INC., Seoul (KR)

(72) Inventor: Dong Won Lee, Seoul (KR)

(73) Assignee: GAMEVIL INC., Seoul (KR)

(*) Notice: Subject to any disclaimer, the term of this patent is extended or adjusted under 35 U.S.C. 154(b) by 66 days.

(21) Appl. No.: 16/876,972

(22) Filed: May 18, 2020

(65) Prior Publication Data

US 2020/0376390 A1    Dec. 3, 2020

(30) Foreign Application Priority Data

Jun. 3, 2019   (KR) .................. 10-2019-0065191

(51) Int. Cl.
*A63F 13/812* (2014.01)
*A63F 13/67* (2014.01)

(52) U.S. Cl.
CPC ............ *A63F 13/812* (2014.09); *A63F 13/67* (2014.09); *A63F 2300/308* (2013.01); *A63F 2300/6027* (2013.01)

(58) Field of Classification Search
CPC .. A63F 13/812; A63F 13/67; A63F 2300/308; A63F 2300/6027; A63F 13/58; A63F 13/69
See application file for complete search history.

(56) References Cited

U.S. PATENT DOCUMENTS

2015/0018091 A1* 1/2015 Suzuki ................. A63F 13/795
463/29
2016/0339336 A1* 11/2016 Matsui ................. A63F 13/426

FOREIGN PATENT DOCUMENTS

| JP | 2003299876 A | 10/2003 |
| JP | 2019042595 A | 3/2019 |
| KR | 10-2014-0122610 | 10/2014 |
| KR | 10-2016-0149981 B1 | 12/2016 |

OTHER PUBLICATIONS

Office Action dated Jun. 8, 2021, in corresponding Japanese application No. 2020-082248 (Japanese version), 2 pages.
"Let's make a professional baseball team!3", Denshu PlayStation, Japan, Media Works, Jun. 24, 2005.
This is the adult Famista! a team that appears on the new platform "enza" Preliminary Report on Development Simulation, Family Communication App [online], Feb. 21, 2018.

(Continued)

*Primary Examiner* — Thomas H Henry
(74) *Attorney, Agent, or Firm* — Christensen O'Connor Johnson Kindness PLLC (57) ABSTRACT

Disclosed are a gaming method and system using skill succession in a sport game. The gaming method may include performing a promotion scenario in which at least one trainer character participates when a promotion mode for a player character is activated in a sports game, configuring a skill set in the at least one trainer character to be handed over to the player character based on an establishment of a relationship between the player character and the at least one trainer character according to the progress of the promotion scenario, and processing the use of the succeeded skill by the player character in a process of performing a sports game instance in which the player character participates.

5 Claims, 7 Drawing Sheets

(56) References Cited

OTHER PUBLICATIONS

Office Action dated Oct. 20, 2020, in corresponding Korean application No. 10-2019-0065191 (Korean version), filed Jun. 3, 2019, 7 pages.
"Skill transfer", Internet post (Jun. 16, 2016), https://harmonycho.tistory.com/50, 14 pages.
"Overheat bond system and overheat skill!!", Internet post (Jun. 16, 2016), https://gametesting.tistory.com/151, 14 pages.

* cited by examiner

GAMING METHOD AND SYSTEM USING SKILL SUCCESSION IN SPORTS GAME

CROSS REFERENCE TO RELATED APPLICATION

This application is based on and claims priority under 35 U.S.C. 119 to Korean Patent Application No. 10-2019-0065191, filed on Jun. 3, 2019, in the Korean Intellectual Property Office, the disclosures of which is herein incorporated by reference in their entireties.

BACKGROUND OF THE INVENTION

Field of the Invention

The following description relates to a gaming method and system using skill succession in a sport game.

Related Art

A sports game is a game based on sports, such as baseball, soccer, or basketball. The sports game is divided into an action game genre and a simulation game genre, but the sports game itself tends to be classified as a separate genre. In such a sports game, there are multiple characters that perform a corresponding sports event. In this case, in the sports game, various skills are assigned to characters for a of fun of users. For example, Korean Patent Application Laid-Open No. 10-2014-0122610 relates to a method and terminal for performing a skill action in a mobile game, and discloses that the character of a user sets a specific skill action to be performed on a target character to be shot and sets a shooting condition corresponding to the skill action.

SUMMARY OF THE INVENTION

Provided are a gaming method of handing a skill set in a trainer character down to a player character so that the player character uses the succeeded skill based on the establishment of a relationship between the player character and the trainer character participating in the promotion of the player character in a process of promoting the player character in a sports game, a computer apparatus performing the gaming method, and a computer program stored in a computer-readable recording medium in order to execute the gaming method in the computer apparatus in association with the computer apparatus and a recording medium therefor.

In an embodiment, a gaming method performed by a computer apparatus including at least one processor includes performing, by at least one processor, a promotion scenario in which at least one trainer character participates when a promotion mode for a player character is activated in a sports game, configuring, by the at least one processor, a skill set in the at least one trainer character to be handed over to the player character based on the establishment of a relationship between the player character and the at least one trainer character according to the progress of the promotion scenario, and processing, by the at least one processor, the use of the succeeded skill by the player character in a process of performing a sports game instance in which the player character participates.

According to one aspect, the succeeded skill may include an active skill dynamically driven in response to a user input related to the player character while the sports game instance is performed.

According to another aspect, processing the use of the succeeded skill may include providing a user interface for the use of the succeeded skill in relation to the player character in the process of performing the sports game instance in which the player character participates, and processing the use of the succeeded skill by the player character when a request for the use of the succeeded skill is received through the user interface.

According to yet another aspect, processing the use of the succeeded skill may include displaying, on a progress screen of the sports game instance, directing in which the skill succeeded by the trainer character that has handed the skill down to the player character exercised when the succeeded skill is used in the process of performing the sports game instance in which the player character participates.

According to yet another aspect, displaying the directing may include displaying, on a progress screen of a corresponding sports game instance, the directing in which the skill is used by the player character after the directing.

According to yet another aspect, configuring the skill may include configuring the skill set in the at least one trainer character to be handed over to the player character based on the completion of at least one connection event generated when the relationship is established during the progress of the promotion scenario.

According to yet another aspect, performing the promotion scenario may include providing a user interface for activating a promotion mode for a given player character between sports game instances, and performing a promotion scenario for a selected player character when a promotion mode for the player character selected through the user interface is activated.

In an embodiment, there is provided a non-transitory processor-readable medium having instructions stored thereon, which when executed by one or more processors, cause the one or more processors to implement the method.

In an embodiment, there is provided a computer apparatus including at least one processor implemented to execute instructions readable by a computer. The at least one processor performs a promotion scenario in which at least one trainer character participates when a promotion mode for a player character is activated in a sports game, configures a skill set in the at least one trainer character to be handed over to the player character based on the establishment of a relationship between the player character and the at least one trainer character according to the progress of the promotion scenario, and processes the use of the succeeded skill by the player character in a process of performing a sports game instance in which the player character participates.

DESCRIPTION OF EXEMPLARY EMBODIMENTS

Hereinafter, embodiments are described in detail with reference to the accompanying drawings.

A gaming method according to various embodiments of the present invention may be implemented by at least one computer apparatus. A computer program according to an embodiment of the disclosure may be installed and driven in the computer apparatus. The computer apparatus may perform the gaming method according to an embodiment of the disclosure under the control of a driven computer program. The computer program may be stored in a computer-readable recording medium coupled to the computer apparatus in order to execute the gaming method in the computer apparatus.

Figure 1:
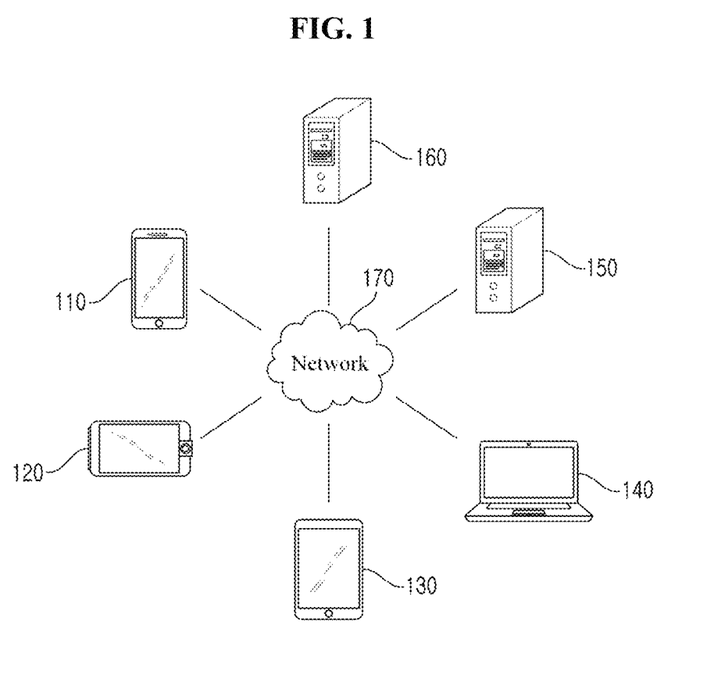
FIG. 1 is a diagram illustrating an example of a network environment according to an embodiment of the present invention.

FIG. 1 is a diagram illustrating an example of a network environment according to an embodiment of the present invention. In FIG. 1, the network environment illustrates an example including a plurality of electronic devices 110, 120, 130 and 140, a plurality of servers 150 and 160, and a network 170. FIG. 1 is an example of a description of the disclosure, and the number of electronic devices or the number of servers is not limited like FIG. 1. Furthermore, the network environment of FIG. 1 illustrates only one of environments which may be applied to the present embodiments, and an environment applicable to the present embodiments is not limited to the network environment of FIG. 1.

The plurality of electronic devices 110, 120, 130 and 140 may be stationary devices or mobile devices implemented as computer apparatuses. For example, the plurality of electronic devices 110, 120, 130 and 140 may include a smartphone, a mobile phone, a navigator, a computer, a laptop, a terminal for digital broadcasting, a personal digital assistants (PDA), a portable multimedia player (PMP), and a tablet PC. For example, in FIG. 1, an example of a shape of the electronic device 1 (110) is illustrated as being a smartphone. However, in embodiments of the present invention, the electronic device 1 (110) may mean one of various physical computer apparatuses capable of communicating with other electronic devices 120, 130 and 140 and/or the servers 150 and 160 over a network 170 substantially using a wireless or wired communication method.

A communication method is not limited, and may include short-distance wireless communication between devices in addition to communication methods using communication networks (e.g., a mobile communication network, wired Internet, wireless Internet and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer apparatus or a plurality of computer apparatuses, which provides a command, code, a file, content, or a service through communication with the plurality of electronic devices 110, 120, 130 and 140 over the network 170. For example, the server 150 may be a system that provides a service (e.g., a game service, a messaging service, a mail service, a social network service, a map service, a translation service, a financial service, a settlement service, a search service, or a content provision service) to the plurality of electronic devices 110, 120, 130 and 140 connected thereto over the network 170.

Figure 2:
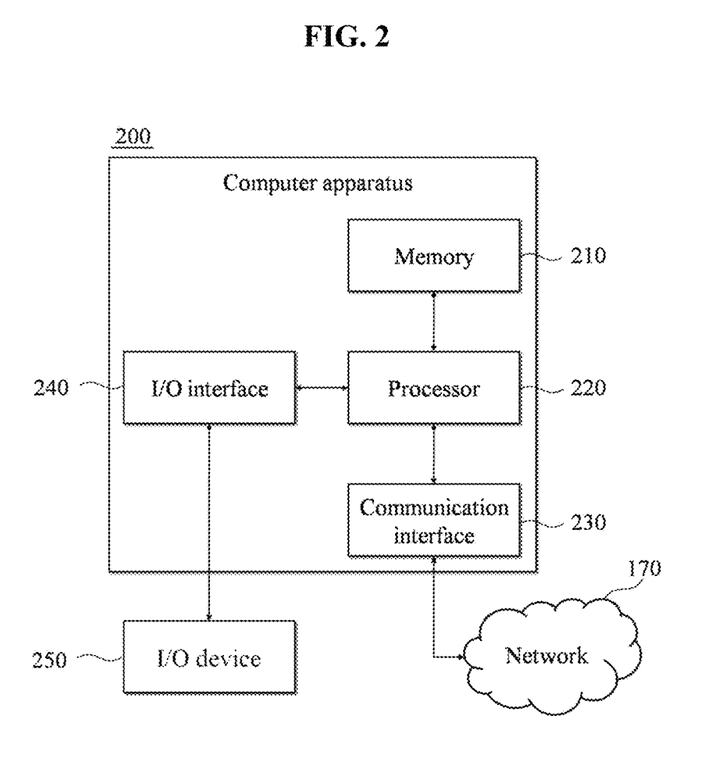
FIG. 2 is a block diagram illustrating an example of a computer apparatus according to an embodiment of the present invention.

FIG. 2 is a block diagram illustrating an example of a computer apparatus according to an embodiment of the present invention. Each of the plurality of electronic devices 110, 120, 130 and 140 or each of the servers 150 and 160 may be implemented by a computer apparatus 200 illustrated in FIG. 2.

As illustrated in FIG. 2, the computer apparatus 200 may include a memory 210, a processor 220, a communication interface 230 and an input/output (I/O) interface 240. The memory 210 is a computer-readable recording medium, and may include permanent mass storage devices, such as a random access memory (RAM), a read only memory (ROM) and a disk drive. In this case, the permanent mass storage device, such as a ROM and a disk drive, may be included in the computer apparatus 200 as a permanent storage device separated from the memory 210. Furthermore, an operating stem and at least one program code may be stored in the memory 210. Such software elements may be loaded from a computer-readable recording medium, separated from the memory 210, to the memory 210. Such a separate computer-readable recording medium may include computer-readable recording media, such as a floppy drive, a disk, a tape, a DVD/CD-ROM drive, and a memory card. In another embodiment, software elements may be loaded onto the memory 210 through the communication interface 230 not a computer-readable recording medium. For example, the software elements may be loaded onto the memory 210 of the computer apparatus 200 based on a computer program installed by files received over the network 170.

The processor 220 may be configured to process instructions of a computer program by performing default arithmetic, logic and I/O operations. The instructions may be provided to the processor 220 by the memory 210 or the communication interface 230. For example, the processor 220 may be configured to execute instructions received according to program code stored in a recording device, such as the memory 210.

The communication interface 230 may provide a function for enabling the computer apparatus 200 to communicate with other devices (e.g., the aforementioned storage devices) over the network 170. For example, a request, a command, data or a file generated by the processor 220 of the computer apparatus 200 based on program code stored in a recording device, such as the memory 210, may be provided to other devices over the network 170 under the control of the communication interface 230. Inversely, a signal, a command, data or a file from another device may be received by the computer apparatus 200 through the communication interface 230 of the computer apparatus 200 over the network 170. A signal, a command or a file received through the communication interface 230 may be transmitted to the processor 220 or the memory 210. A file received through the communication interface 230 may be stored in a storage device (the aforementioned permanent storage device) which may be further included in the computer apparatus 200.

The I/O interface 240 may be means for an interface with an input/output (I/O) device 250. For example, the input device may include a device, such as a microphone, a keyboard, a camera or a mouse. The output device may include a device, such as a display or a speaker. For another example, the I/O interface 240 may be means for an interface with a device in which functions for input and output have been integrated into one, such as a touch screen. The I/O device 250 may be configured as a single device along with the computer apparatus 200.

Furthermore, in other embodiments, the computer apparatus 200 may include elements greater or smaller than the elements of FIG. 2. However, it is not necessary to clearly illustrate most of conventional elements. For example, the computer apparatus 200 may be implemented to include at least some of the I/O device 250 or may further include other elements, such as a transceiver and a database.

Figure 3:
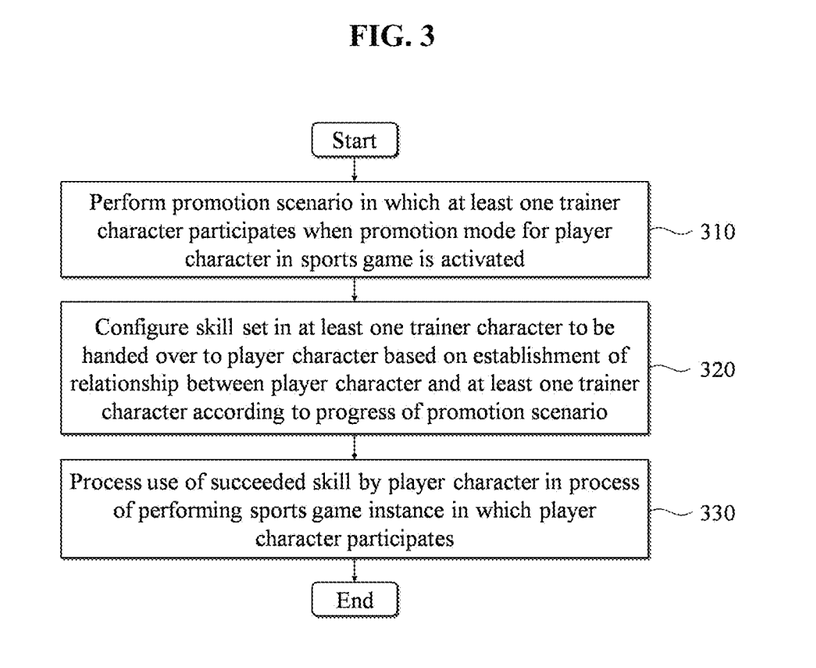
FIG. 3 is a flowchart illustrating an example of a gaming method according to an embodiment of the present invention.

FIG. 3 is a flowchart illustrating an example of a gaming method according to an embodiment of the present invention. The gaming method according to the present embodiment may be performed by the computer apparatus 200. For example, the processor 220 of the computer apparatus 200 may be implemented to execute a control instruction based on a code of an operating system or a code of at least one computer program included in the memory 210. In this case, the processor 220 may control the computer apparatus 200 to perform steps 310 to 330 included in the method of FIG. 3 in response to a control instruction provided by a code stored in the computer apparatus 200. In this case, the computer program may include a game app for a sports game. Each of steps 310 to 330 may be performed by the processor 220 based on a code of the computer program. In some embodiments, at least one of steps 310 to 330 may be performed through communication with a server (e.g., the server 150 described with reference to FIG. 1) for providing a game service over the network 170 under the control of a computer program.

At step 310, the computer apparatus 200 may perform a promotion scenario in which at least one trainer character participates when a promotion mode for a player character in a sports game is activated. For example, the computer apparatus 200 may provide a user interface for activating a promotion mode for a given player character between sports game instances, and may perform a promotion scenario for a selected player character when a promotion mode for the player character selected through the user interface is activated. In other words, the progress of a promotion scenario may be performed separately from the progress of a sports game instance.

At step 320, the computer apparatus 200 may configure a skill set in the at least one trainer character to be handed over to the player character based on the establishment of a relationship between the player character and the at least one trainer character according to the progress of the promotion scenario. For example, a user interface for activating a promotion mode may include a function for selecting a player character and at least one trainer character. A promotion scenario in which the selected player character and the selected trainer character participate may be performed. In this case, as the promotion scenario proceeds, a relationship may be established between the player character and the trainer character based on specific conditions. A skill preset in the trainer character may be handed over to the player character based on the establishment of the relationship. In this case, the succeeded skill is not a passive skill for simply increasing the status of the player character, but may include an active skill dynamically driven in response to a user input related to the player character while a sports game instance is performed. As a more detailed example, the computer apparatus 200 may provide a user interface for the use of a succeeded skill in relationship to a player character in a process of performing a sports game instance in which the player character participates. In this case, when a request to use the succeeded skill is received through the user interface for the use of the succeeded skill, the computer apparatus 200 may process the use of the succeeded skill by the player character. In some embodiments, in a gaming system capable of automatic play, the computer apparatus 200 may dynamically drive a succeeded skill in response to a user input for the activation of automatic play. This may be understood that the user does not specify timing at which a skill is used, but the computer apparatus 200 dynamically drives a succeeded skill in an active form in response to a user input.

At step 330, the computer apparatus 200 may process the use of the succeeded skill by the player character in a process of performing a sports game instance in which the player character participates. In other words, the player character may succeed the skill set in the trainer character having the relationship with the player character not a skill previously set in the player character. In this case, In some embodiments, if a succeeded skill is used in a process of performing a sports game instance in which a player character participates, the computer apparatus 200 may display, on a progress screen of the sports game instance, directing in which the succeeded skill is exercised by a trainer character that has handed the skill down to the player character, and may display, on a progress screen of a corresponding sports game instance, directing in which the skill is used by the player character after such directing. In other words, more various types of fun can be provided to users because the users are provided with visual indication indicating that a player character succeeds the skill of a trainer character having a relationship with the player character and uses the skill.

In a promotion scenario, three major growth systems of training, an event and a connection may provide various types of content along with the promotion of a player character while interacting with each other. For example, a likeability value between a player character and a trainer character may be adjusted based on at least one of training and an event generated according to the progress of a promotion scenario. A connection relationship the player character and the given trainer character may be established between based on the likeability value. A boosting effect for increasing a training effect may be applied to the training of the player character based on the established connection relationship. In other words, the training and event enable the connection relationship to be established between the player character and the trainer character by adjusting a likeability value between the player character and the trainer character. The connection relationship may be incorporated into the training again to increase the training effect. Accordingly, more various types of content related to the promotion of the player character without simply training the player character can be provided.

In this case, the relationship between the player character and the at least one trainer character described at step 320 of FIG. 3 may correspond to such a connection relationship. When such a relationship is established in the progress of the promotion scenario, at least one connection event related to the trainer character may be generated with respect to the player character. In this case, the computer apparatus 200 may configure a skill set in the at least one trainer character to be handed over to the player character based on the completion of the at least one connection event generated as the relationship is established at step 320. In other words, as a promotion scenario is performed on a player character specified by a user, if a likeability value between the player character and a trainer character is adjusted based on training and an event and a relationship is established between the player character and the trainer character based on the likeability value, at least one connection event may be generated. When the at least one connection event for the player character is completed, the computer apparatus 200 may process a skill set in the trainer character to be handed over to the player character.

Figure 4:
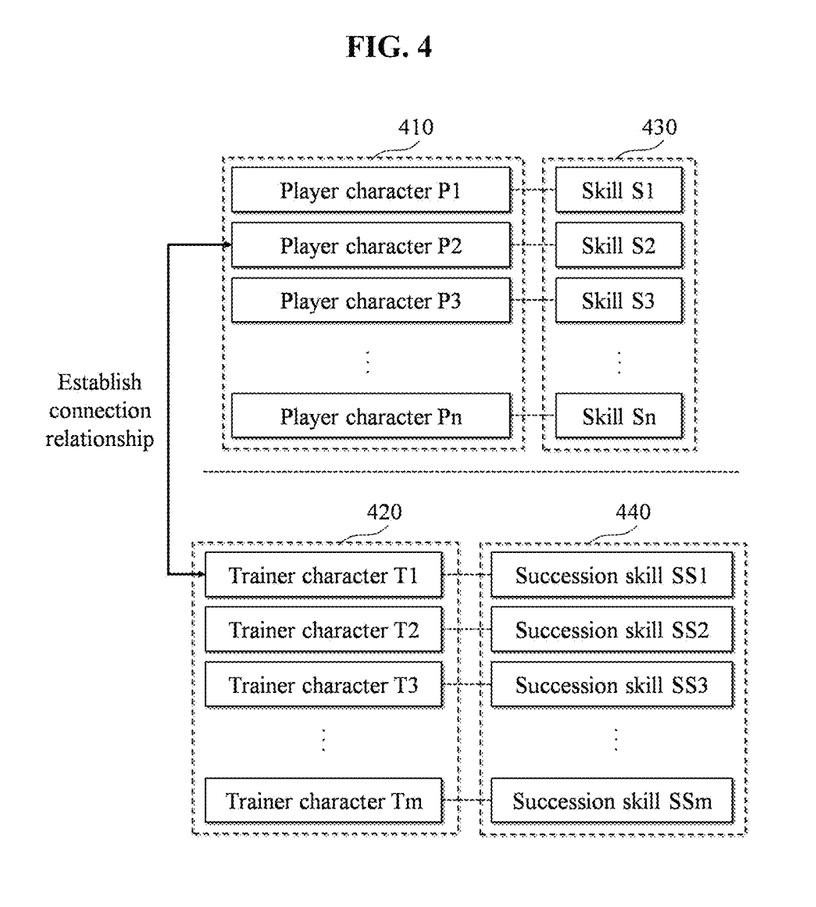
FIG. 4 is a diagram illustrating an example in which player characters, trainer characters and skills are managed in an embodiment of the present invention.

FIG. 4 is a diagram illustrating an example in which player characters, trainer characters and skills are managed in an embodiment of the present invention. The computer apparatus 200 (or a server that provides, to the computer apparatus 200, a game server over the network 170) may manage multiple player characters 410 and multiple trainer characters 420. In this case, each of the characters may be managed based on an identifier. In the embodiment of FIG. 4, for convenience of description, the identifiers of the player characters 410 are indicated as {P1, P2, P3, . . . , Pn}, respectively, and the identifiers of the trainer characters are indicated as {T1, T2, T3, . . . , Tm}, respectively. In some embodiments, at least one skill may be set in the player characters 410. In the embodiment of FIG. 4, it is assumed that the player characters 410 have respective skills, for convenience of description. Such multiple skills 430 are indicated as identifiers {S1, S2, S3, . . . , Sn}. Furthermore, at least one succession skill may be set in the trainer characters 420. The embodiment of FIG. 4 illustrates an example in which the trainer characters 420 have respective skills. Such multiple succession skills 440 are indicated as identifiers {SS1, SS2, SS3, . . . , SSm}.

It is assumed that a user selects a player character P2 through a user interface for the activation of a promotion mode, selects the trainer characters {T1, T2}, and performs a promotion scenario. As the promotion scenario proceeds, a likeability value between the player character P2 and the trainer characters {T1, T2} may be adjusted. In this case, it is assumed that a likeability value between the player character P2 and the trainer character T1 is a preset value or more and thus a connection relationship has been established between the player character P2 and the trainer character T1. At this time, a succession skill SS1 set in the trainer character T1 may be handed over to the player character P2. Such association relationships may be recognized by the computer apparatus 200 using a method of associating and storing the identifiers. For example, the identifier P2 and the identifier SS1 may be associated and stored. In a process of performing a given sports game instance, the computer apparatus 200 may identify the succession skill SS1 stored in association with the player character P2 in relation to the player character P2, and may provide a user interface for the use of the succession skill SS1 handed over to the player character P2.

Figure 5:
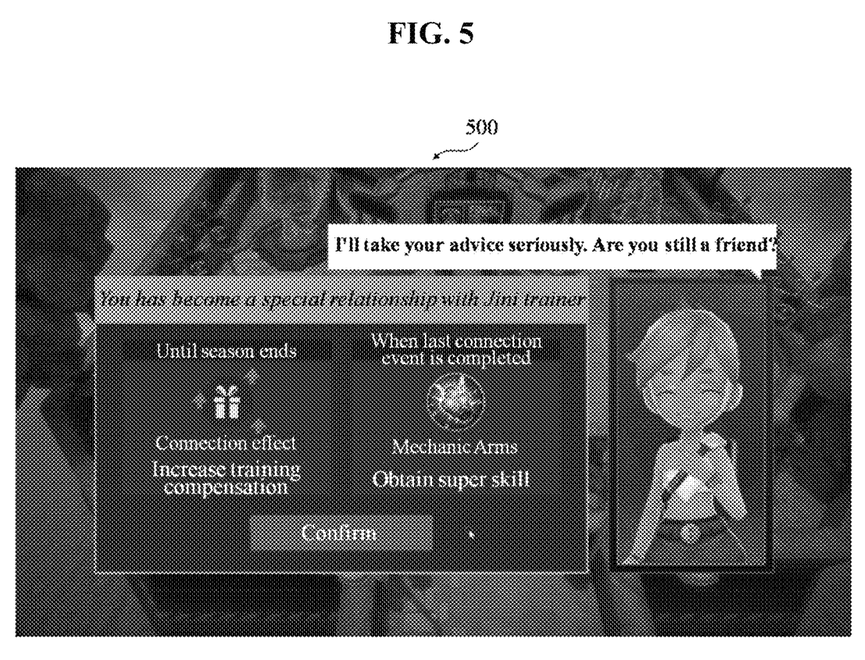
FIG. 5 is a diagram illustrating an example of the establishment of a relationship between a player character and a trainer character in an embodiment of the present invention.

FIG. 5 is a diagram illustrating an example of the establishment of a relationship between a player character and a trainer character in an embodiment of the present invention. In FIG. 5, a screen implementation example 500 illustrates an example of a process of establishing a relationship between a specific player character and a specific trainer character (in the embodiment of FIG. 5, "Jini" trainer) during the progress of a promotion scenario. In one embodiment, a succession condition for a skill may include a condition in which a relationship is established between a player character and a trainer character. In another embodiment, a succession condition for a skill may include a condition in which at least one connection event provided after a relationship between a player character and a trainer character is established is completed.

Figure 6:
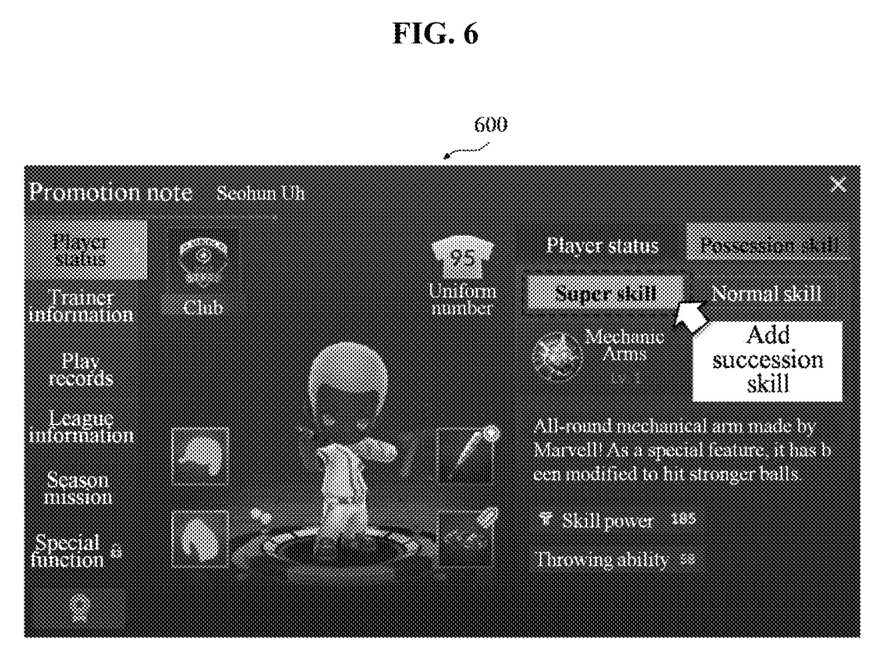
FIG. 6 is a diagram illustrating an example in which a succession skill has been added to a player character in an embodiment of the present invention.

FIG. 6 is a diagram illustrating an example in which a succession skill has been added to a player character in an embodiment of the present invention. In FIG. 6, a screen implementation example 600 는 the player character illustrates an example in which a "super skill" in addition to a "normal skill" has been added to a "possession skill" as a succession skill. Such a succession skill may have a form of an active skill which may be dynamically driven during the progress of a sports game instance not a form of a passive skill for simply increasing the status of a player character.

Figure 7:
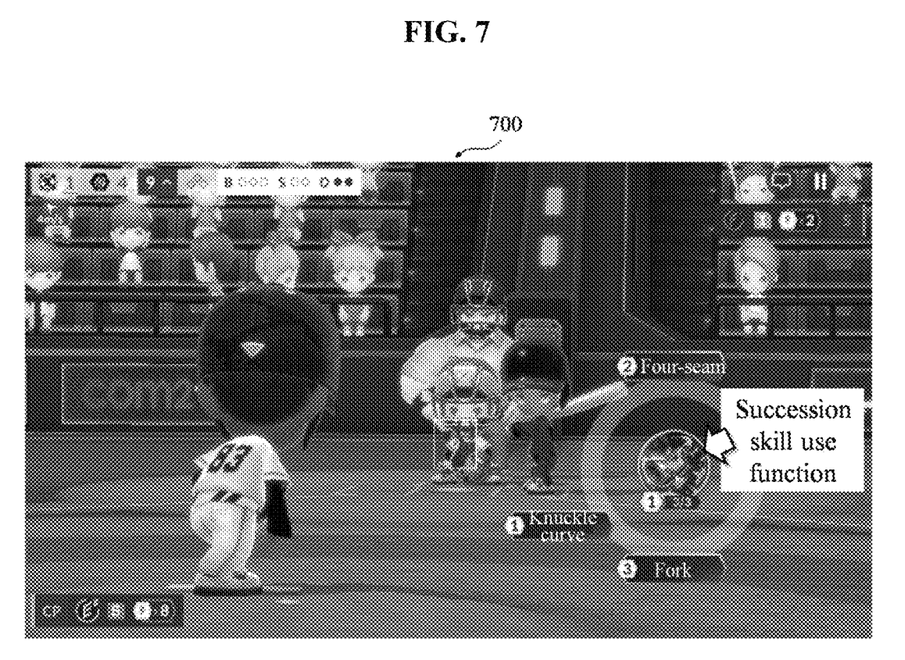
FIG. 7 is a diagram illustrating an example of a succession skill use function in a sports game instance in an embodiment of the present invention.

FIG. 7 is a diagram illustrating an example of a succession skill use function in a sports game instance in an embodiment of the present invention. In FIG. 7, a screen implementation example 700 illustrates an example in which a user interface for the use of a succeeded skill (i.e., succession skill use function) in relation to a player character having the position of a pitcher in a baseball game instance has been added. When the user interface is selected (e.g., when a user touches the region in which the user interface is displayed with a finger in a touch screen environment or a user clicks the region in which the user interface is displayed using a mouse in a PC environment), the succeeded skill may be used. When the succeeded skill is used, directing in which a trainer character appears and exercises the succession skill may be displayed on a screen (e.g., a display included as the I/O device 250 of the computer apparatus 200) in order to indicate that the player character has succeeded the skill of the trainer character and uses the succession skill. In contrast, if the player character actually uses the succession skill, directing performed by the player character may be displayed on a screen. For example, in a baseball game instance, in the case of a player character having the position of a pitcher, after animation directing in which a trainer character appears and exercises a succeeded skill is displayed on a screen, animation directing in which the player character actually appears and throws a ball based on the succeeded skill may be displayed on a screen.

The aforementioned system or apparatus may be implemented in the form of a hardware element or a combination of a hardware element and a software element. For example, the apparatus and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processor may perform an operating system (OS) and one or more software applications executed on the OS. Furthermore, the processor may access, store, manipulate, process and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or store media managed in a server. Examples of the program instruction may include machine-language code, such as code written by a compiler, and high-level language code executable by a computer using an interpreter. The hardware apparatus may be configured to operate one or more software modules in order to perform an operation of an embodiment, and vice versa.

As described above, according to embodiments of the present invention, in a process of promoting a player character in a sports game, a skill set in a trainer character is handed over to the player character based on the establishment of a relationship between the player character and the trainer character participating in the promotion of the player character, and the player character uses the succeeded skill. Accordingly, a new fun element called skill succession based on a relationship between characters in addition to the simple improvement of the status of a player character based on training upon promotion of the player character can be provided to a user.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

What is claimed is:

1. A non-transitory processor-readable medium having instructions stored thereon, which when executed by one or more processors, cause the one or more processors to implement a gaming method of a sports game, comprising:
   performing, by the processors, a promotion scenario for promoting a player character of the sports game in which at least one trainer character of the sports game participates when a promotion mode for the player character is activated in the sports game;
   setting, by the processors, a skill which the at least one trainer character uses in the sports game as a succeeded skill to be learned by the player character based on an establishment of a relationship between the player character and the at least one trainer character according to the progress of the promotion scenario; and
   processing, by the processors, a use of the succeeded skill by the player character in a process of performing a sports game instance of the sports game in which the player character participates,
   wherein the promotion scenario is progressed by an interaction of three growth systems for the player character implemented in the sports game, the three growth systems including an event system, a training system, and a relationship system,
   wherein, in the sports game, the player character learns the succeeded skill in response that a succession condition is met, and the succession condition includes the establishment of the relationship between the player character and the trainer character and a completion of an event after the establishment of the relationship,
   wherein the setting comprises:
      adjusting a likeability value between the player character and the trainer character based on a training of the player character in the sports game in accordance with the progress of the promotion scenario;
      establishing the relationship between the player character and the trainer character based on the adjusted likeability value;
      providing the player character with the event in response to the establishment of the relationship; and
      rendering the player character to learn the succeeded skill by associating an identifier of the player character with an identifier of the succeeded skill and storing the association in a database associated with the sports game in response to the completion of the event,
   wherein the processing comprises:
      during the sports game instance being performed, identifying the association stored in the database;
      providing, based on the identification of the association, a user terminal of a user of the player character with a user interface to render the player character to use the succeeded skill;
      processing the use of the succeeded skill by the player character in response to a request for the use of the succeeded skill being input through the user interface by the user; and
      when the succeeded skill is used by the player character, displaying, on the user terminal, an effect representing an activation of the succeeded skill by the player character, and subsequently displaying an effect representing the use of the succeeded skill by the player character.

2. The non-transitory processor-readable medium of claim 1, wherein the succeeded skill comprises an active skill dynamically driven in response to a user input related to the player character while the sports game instance is performed.

3. The non-transitory processor-readable medium of claim 1, wherein performing the promotion scenario comprises:
providing the user terminal with a user interface for activating the promotion mode for a given player character between sports game instances of the sports game, and
performing a promotion scenario for a player character selected through the user interface in response that the promotion mode for the selected player character is activated.

4. A gaming method of a sports game performed by a computer apparatus comprising at least one processor, the gaming method comprising:
performing, by the at least one processor, a promotion scenario for promoting a player character of the sports game in which at least one trainer character of the sports game participates when a promotion mode for the player character is activated in a sports game;
setting, by the at least one processor, a skill which the at least one trainer character uses in the sports game as a succeeded skill to be learned by the player character based on an establishment of a relationship between the player character and the at least one trainer character according to the progress of the promotion scenario; and
processing, by the at least one processor, a use of the succeeded skill by the player character in a process of performing a sports game of the sports game instance in which the player character participates,
wherein the promotion scenario is progressed by an interaction of three growth systems for the player character implemented in the sports game, the three growth systems including an event system, a training system, and a relationship system,
wherein, in the sports game, the player character learns the succeeded skill in response that a succession condition is met, and the succession condition includes the establishment of the relationship between the player character and the trainer character and a completion of an event after the establishment of the relationship,
wherein the setting comprises:
adjusting a likeability value between the player character and the trainer character based on a training of the player character in the sports game in accordance with the progress of the promotion scenario;
establishing the relationship between the player character and the trainer character based on the adjusted likeability value;
providing the player character with the event in response to the establishment of the relationship; and
rendering the player character to learn the succeeded skill by associating an identifier of the player character with an identifier of the succeeded skill and storing the association in a database associated with the sports game in response to the completion of the event,
wherein the processing comprises:
during the sports game instance being performed, identifying the association stored in the database;
providing, based on the identification of the association, a user terminal of a user of the player character with a user interface to render the player character to use the succeeded skill;
processing the use of the succeeded skill by the player character in response to a request for the use of the succeeded skill being input through the user interface by the user; and
when the succeeded skill is used by the player character, displaying, on the user terminal, an effect representing an activation of the succeeded skill by the player character, and subsequently displaying an effect representing the use of the succeeded skill by the player character.

5. The gaming method of claim 4, wherein the succeeded skill comprises an active skill dynamically driven in response to a user input related to the player character while the sports game instance is performed.

* * * * *